(12) United States Patent
Mohler

(10) Patent No.: US 7,839,041 B2
(45) Date of Patent: Nov. 23, 2010

(54) ROTARY ACTUATORS

(75) Inventor: David B Mohler, Tipp City, OH (US)

(73) Assignee: Saia-Burgess Inc., Vandalia, OH (US)

( * ) Notice: Subject to any disclaimer, the term of this patent is extended or adjusted under 35 U.S.C. 154(b) by 0 days.

(21) Appl. No.: 12/396,549

(22) Filed: Mar. 3, 2009

(65) Prior Publication Data
US 2009/0218902 A1   Sep. 3, 2009

Related U.S. Application Data

(60) Provisional application No. 61/033,073, filed on Mar. 3, 2008.

(51) Int. Cl.
*H02K 21/12* (2006.01)
(52) U.S. Cl. .................... 310/156.32; 310/36
(58) Field of Classification Search .............. 310/36, 310/156.32, 156.33, 15; 335/220
See application file for complete search history.

(56) References Cited

U.S. PATENT DOCUMENTS 5,337,030 A   8/1994   Mohler 6,507,257 B2 *   1/2003   Mohler ................ 335/220

FOREIGN PATENT DOCUMENTS

| DE | 199 45 262 A1 | 4/2001 |
| EP | 0 175 903 A1 | 4/1986 |
| EP | 0 411 563 A1 | 2/1991 |
| JP | 6-225508 A | 8/1994 |

OTHER PUBLICATIONS

International Search Report and Written Opinion mailed Oct. 21, 2009 in corresponding PCT Application No. PCT/US2009/001331.

* cited by examiner

*Primary Examiner*—Nguyen N Hanh
(74) *Attorney, Agent, or Firm*—Nixon & Vanderhye, P.C.

(57) ABSTRACT

Embodiments of actuators (20) comprise an electromagnetically conductive housing (22); a rotor (24); a first stationary pole member (48); a second stationary pole member (42); a first permanent magnet (44) connected to the first pole member (48); a second permanent magnet (46) connected to the first pole member (48); and; an electrically conductive coil (40) situated within the housing (22) and configured to define a cavity. The rotor (24) comprises a rotor shaft (26) and a rotor flange (28). The rotor flange (28) comprises both a first flange segment (56) and a second flange segment (58) which extend in different radial directions relative to the rotor shaft (26).

19 Claims, 7 Drawing Sheets

ROTARY ACTUATORS

This application claims benefit and priority of U.S. Provisional Application 61/033,073 filed Mar. 3, 2008, entitled "Bi-Stable, Bi-Directional, Latching Rotary Solenoid with Position Sensor", the entire contents of which is hereby incorporated by reference.

BACKGROUND

I. Technical Field

This invention pertains to electromagnetically actuated actuators.

II. Related Art and Other Considerations

U.S. Pat. No. 5,337,030 to Mohler, incorporated by reference herein in its entirety, shows a rotary actuator wherein permanent magnets comprise a magnet rotor.

BRIEF SUMMARY

Embodiments of actuators comprise an electromagnetically conductive housing; a rotor; a first stationary pole member retained at a first axial position with respect to a rotor axis; a second stationary pole member retained at a second axial position with respect to the rotor axis; a first permanent magnet connected to the first pole member; a second permanent magnet connected to the first pole member; and; an electrically conductive coil situated within the housing and configured to define a cavity. The rotor comprises a rotor shaft and a rotor flange. The rotor shaft is situated for rotational motion about the rotor axis and extends axially beyond the housing. The electromagnetically conductive rotor flange is connected to the rotor shaft and comprises both a first flange segment and a second flange segment which extend in different radial directions relative to the rotor shaft. The first permanent magnet extends essentially on a first radial side of the rotor axis and comprises a north pole segment and a south pole segment. The second permanent magnet extends essentially on a second radial side of the rotor axis and comprises a north pole segment and a south pole segment. In the cavity defined by the coil are arranged, in axial order, the second stationary pole member, the rotor flange, the first permanent magnet and the second permanent magnet; and the first stationary pole member, with a first air gap provided between the rotor flange and the first permanent magnet and a second air gap provided between the rotor flange and the second stationary pole member.

In one example embodiment which functions as a bistable solenoid, the rotor is held in either a first latched radial position or a second latched radial position and is switched between the first latched radial position and the second latched radial position in dependence upon direction of electrical current applied to the coil. The bistable actuator embodiment comprises a first stop member and a second stop member mounted at radially spaced apart locations to the second stationary pole member, with the first stop member and the second stop member extending in a direction parallel to the rotor axis for selective abutment of the rotor flange. In the bistable actuator embodiment in the first latched radial position the first flange segment of the rotor at least partially axially overlaps the north pole segment of the first permanent magnet and the second flange segment of the rotor at least partially axially overlaps the north pole segment of the second permanent magnet, with the rotor flange abutting the first stop member. In the bistable actuator embodiment in the second latched radial position the first flange segment of the rotor at least partially axially overlaps the south pole segment of the second permanent magnet and the second flange segment of the rotor at least partially axially overlaps the south pole segment of the first permanent magnet, with the rotor flange abutting the second stop member. The bistable actuator embodiment can also further comprise a location sensor mounted on the second stationary pole member but positioned radially between the first permanent magnet and the second permanent magnet whereby, in the first latched position the rotor flange overlies at least a portion of first permanent magnet and the location sensor but not the second permanent magnet, and in the second latched position the same rotor flange overlies at least a portion of the second permanent magnet and the location sensor, but not the first permanent magnet.

In another example embodiment which functions as a unistable solenoid the rotor is held in a stable position whereat the first flange segment equally overlaps the north pole segment and the south pole segment of the first permanent magnet and the second flange segment equally overlaps the north pole segment and the south pole segment of the second permanent magnet. In the unistable actuator embodiment the rotor can be rotated away from the stable position by application of a current to the electrically conductive coil. The unistable actuator embodiment can further comprise two clockwise boundary stop members and two counter clockwise boundary stop members mounted at radially spaced apart locations to the second stationary pole member. The stop members extend in a direction parallel to the rotor axis for selective abutment of the rotor flange.

The first permanent magnet and the second permanent magnet of example embodiments of the actuators described herein each have semi-torroidal shape about the rotor axis and are circumferentially spaced apart on the first stationary pole member. Preferably the first permanent magnet and the second permanent magnet are symmetric about the rotor axis. Each of the first flange segment and the second flange segment can take the form of pie-shaped wedges that extend in opposite directions in a radial plane that is perpendicular to the rotor axis.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
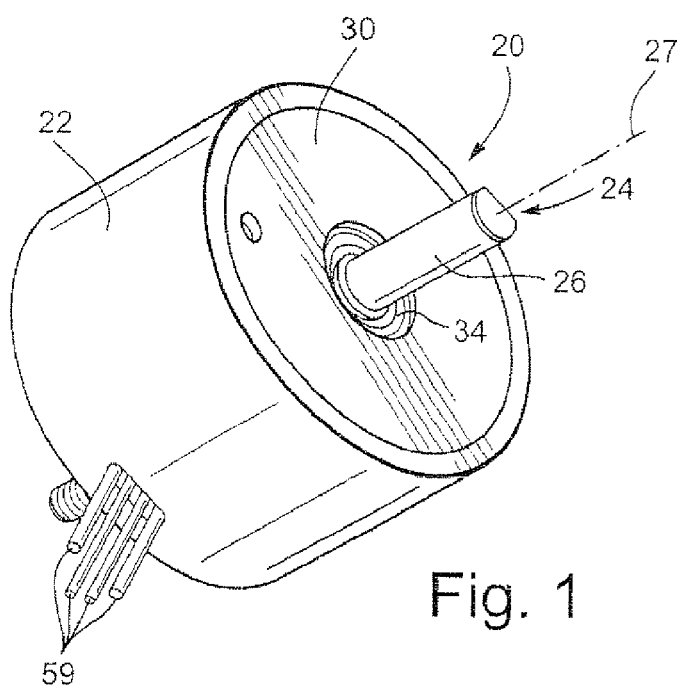
FIG. 1 is a perspective view of an example embodiment of a generic actuator.
Figure 2:
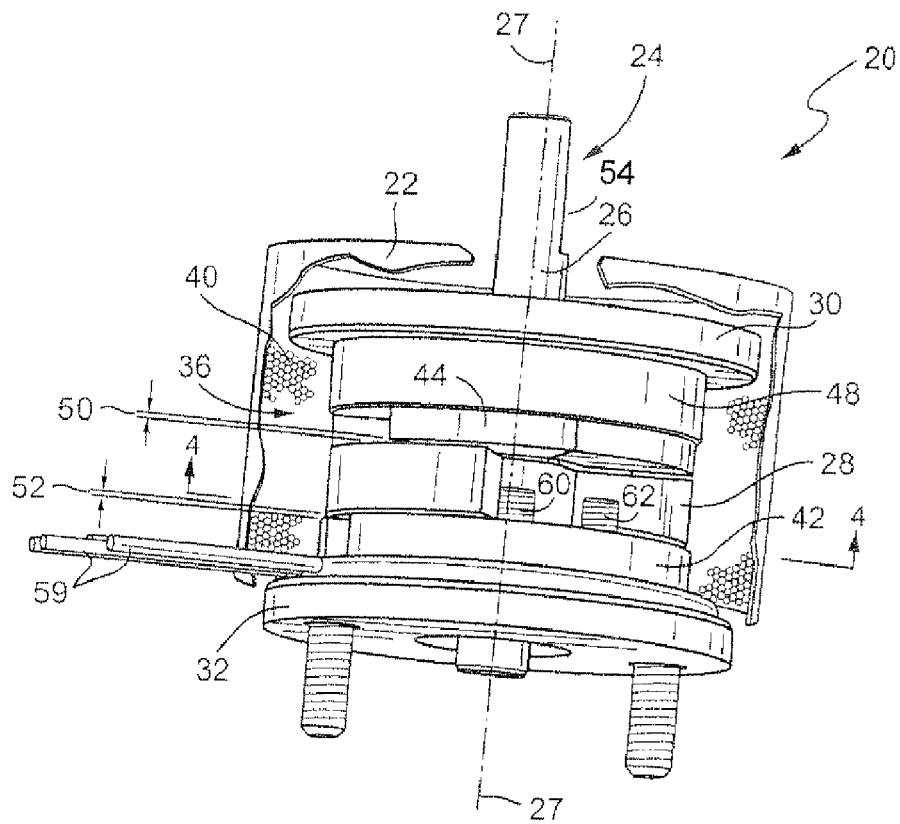
FIG. 2 is a partially exploded side view of the example actuator of FIG. 1.

The technology disclosed herein concerns embodiments of actuators for which FIG. 1 and FIG. 2 provide a generic representation. Specific discussion of an example embodiment of a bistable actuator is subsequently provided with respect to FIG. 5-FIG. 7; specific discussion of an example embodiment of a unistable actuator is subsequently provided with respect to FIG. 12-FIG. 14. In both example embodiments the flux is in an axial direction across air gaps.

As shown in FIG. 1 and FIG. 2, a generic actuator 20 comprises electromagnetically conductive housing 22 which, in an example embodiment, takes the form of a hollow cylinder. A rotor 24 is situated at a major cylindrical axis of the housing 22. As shown by itself in FIG. 3, rotor 24 comprises rotor shaft 26 having rotor axis 27 and rotor flange 28. A first end of rotor 24 rotatably extends through base upper wall 30 which is fit into a first axial end of housing 22; a second end of rotor 24 rotatably extends through base lower wall 32 which is fit into a second axial end of housing 22. Bearings such as bearing 34 are provided to facilitate rotatable extension of rotor shaft 26 through base upper wall 30 and base lower wall 32.

As partially depicted in FIG. 2, an essentially toroidal shaped coil space 36 is provided adjacent an interior surface of housing 22 in an axial position between base upper wall 30 and base lower wall 32. An electrically conductive coil 40 is situated within housing 22 (and particularly in coil space 36) and is configured to define a cylindrical cavity which accommodates other elements of generic actuator 20.

Figure 4:
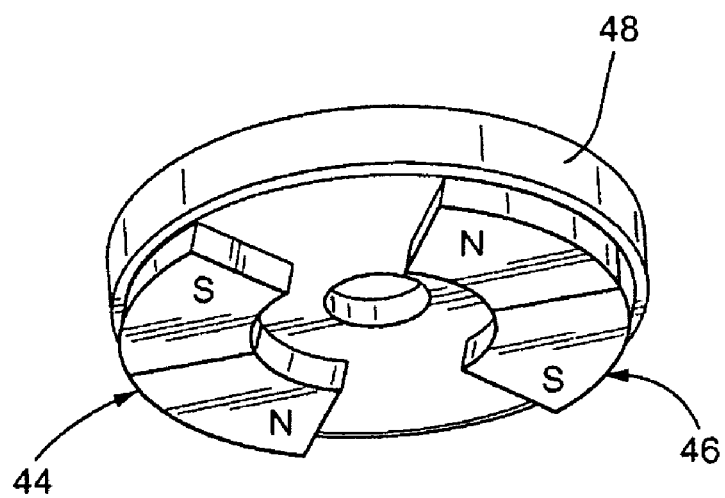
FIG. 4 is a perspective view of an example embodiment of a first stationary pole member (having permanent magnets attached thereto) which comprises the generic actuator of FIG. 2.

As shown in FIG. 2, in the cavity defined by coil 40 are arranged, in axial order from bottom to top, lower or second stationary pole member 42; rotor flange 28, a first permanent magnet 44 and a second permanent magnet 46; and upper or first stationary pole member 48. As shown in FIG. 4, the first permanent magnet 44 and second permanent magnet 46 are mounted, bonded, or otherwise affixed to an underside of first stationary pole member 48. A first air gap 50 is provided between rotor flange 28 and the permanent magnets 44, 46 mounted on the underside of first stationary pole member 48. A second air gap 52 is provided between rotor flange 38 and second stationary pole member 42. Thus, as shown in FIG. 2, the first stationary pole member 48 is retained at a first axial position with respect to rotor axis 27; the second stationary pole member 42 is retained at a second axial position with respect to rotor axis 27.

Figure 3:
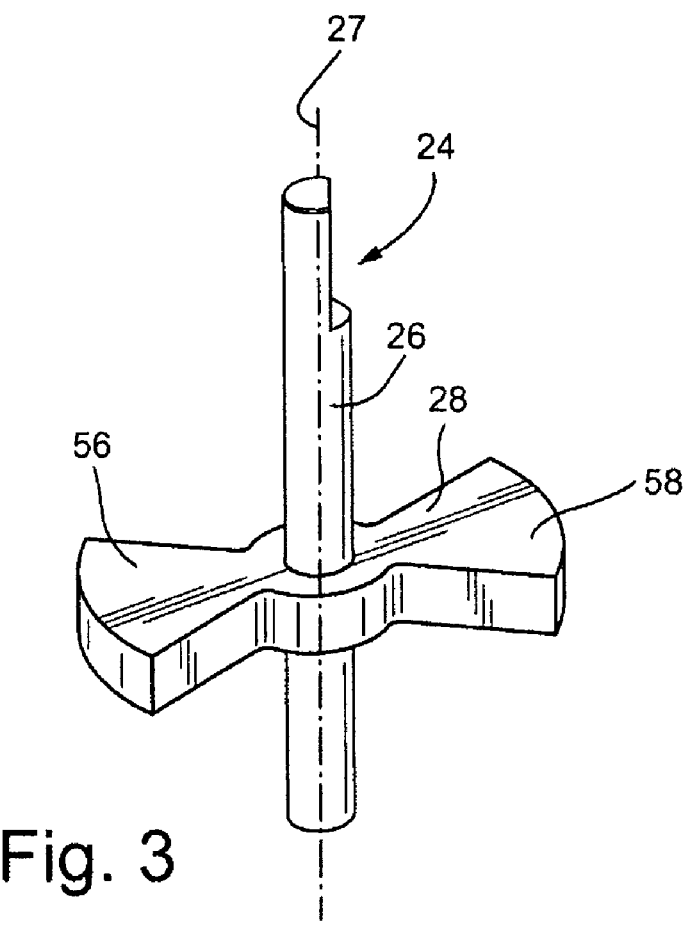
FIG. 3 is a perspective view of an example embodiment of a rotor which comprises the generic actuator of FIG. 2.

As indicated previously, rotor shaft 26 is situated for rotational motion about rotor axis 27 and extends axially beyond the housing (e.g., extends axially beyond at least one of base upper wall 30 and base lower wall 32). As shown in FIG. 1-FIG. 3, an upper end of rotor shaft 26 can comprise rotor shaft keyed portion 54 and/or otherwise be configured for output/takeoff connection. The electromagnetically conductive rotor flange 28 is connected to rotor shaft 26 and, as shown in FIG. 3, comprises both first flange segment 56 and second flange segment 58. In an illustrated example embodiment, both second flange segment 60 and second flange segment 58 take the form of pie-shaped wedges that extend in different (e.g., 180 degree opposite) directions in a radial plane that is perpendicular to the rotor axis 27.

As mentioned previously and illustrated in FIG. 4, both first permanent magnet 44 and second permanent magnet 46 are mounted to a bottom surface of first stationary pole member 48. Thus, both first permanent magnet 44 and second permanent magnet 46 are themselves stationary. The first permanent magnet 44 is positioned (e.g., extends) essentially on a first radial side of rotor axis 27; second permanent magnet 46 is positioned (e.g., extends) essentially on a second radial side of rotor axis 27. In other words, in an embodiment in which first stationary pole member 48 is disk shaped, first permanent magnet 44 and second permanent magnet 46 are mounted on different halves of first stationary pole member 48 and are essentially equidistantly spaced from rotor axis 27. Each of first permanent magnet 44 and second permanent magnet 46 comprise both a north pole segment and a south pole segment.

In the example embodiment shown in FIG. 4 and other figures, each of first permanent magnet 44 and second permanent magnet 46 can have semi-torroidal shape about rotor axis 27. That is, each of first permanent magnet 44 and second permanent magnet 46 can take the form of a crescent mounted to depend from beneath first stationary pole member 48 and to extend through less than a 180 degree angle about rotor axis 27. Preferably first permanent magnet 44 and second permanent magnet 46 are symmetric about rotor axis 27. The first permanent magnet 44 and second permanent magnet 46 are positioned to have their outer circumferences situated proximate the circumference of first stationary pole member 48, and are circumferentially spaced apart on first stationary pole member 48.

FIG. 1 and FIG. 2 both show that wires 59, such as wires of coil 40 and sensor wires for a location sensor described subsequently, extend radially through an aperture in housing 22 for connection to a voltage source and/or circuitry or instrumentation. Alternatively, the wires of coil 40 and sensor wires can extend axially through either of the end bases.

The principal air gap flux in air gap 51 and air gap 52 is in an axial direction (e.g., parallel to rotor axis 27). By capitalizing upon an axial air gap flux, the example embodiments facilitate a simpler, more cost effective coil winding construction.

One example embodiment and mode of operation described herein is that of a bistable rotary actuator. The structure and operation of the bistable rotary actuator is shown with reference to FIG. 5-FIG. 7 in addition to the generic depiction of FIG. 1-FIG. 4. FIG. 2 shows an internal assembly view wherein the end bases (e.g., second stationary pole member 42 and first stationary pole member 48) are ferrous (magnetically permeable), as is the outer housing 22. As mentioned above, housing 22 is, in an example embodiment, a simple hollow cylinder into which the bases 42, 48 are press-fitted. The rotor flange 28 is ferrous while rotor shaft 26 is a non-magnetic material (e.g., stainless steel). Each of two magnets (e.g., first permanent magnet 44 and second permanent magnet 46) is magnetized, as seen in FIG. 4-FIG. 7) to provide both a north and a south magnetic face on both sides. The magnets 44, 46 are bonded to one of the bases (e.g., bonded to first stationary pole member 48 in the example illustrated embodiment) for efficient flux transfer and to constrain the magnets 44, 46 against movement (since the first permanent magnet 44 and second permanent magnet 46 will experience a tractive force toward the rotor 24).

Bearings 34 of the ball-bearing type are used to constrain the rotor & shaft assembly both radially and axially to allow freedom of rotation without making contact with a base pole 42, 48 or with a magnet 44, 46. Axial constraint can be effected by means of retaining clips affixed into grooves cut into the rotor shaft 26 at two locations. Shim washers located between each retaining clip and a bearing 34 are used to axially locate the rotor shaft 26 and to provide approximately equal air gaps 50, 52 between each upper and lower rotor surface and its adjacent stator feature. One such feature is a base surface of second stationary pole member 42, the other such feature is the magnet surfaces of first permanent magnet 44 and second permanent magnet 46.

The bistable actuator embodiment comprises first stop member 60 and second stop member 62 mounted at radially spaced apart locations to an upper surface of second stationary pole member 42. Both first stop member 60 and second stop member 62 extending in a direction parallel to rotor axis 27, e.g., upwardly from the upper surface of second stationary pole member 42, and are configured for selective abutment of an edge of the rotor flange 28. The stop pins 60, 62, which are non-ferrous, are press-fitted into a base (e.g., second stationary pole member 42) and are located to set the limits of rotation of the rotor 24, and to set its starting and ending positions relative to the magnets (first permanent magnet 44 and second permanent magnet 46).

Figure 5:
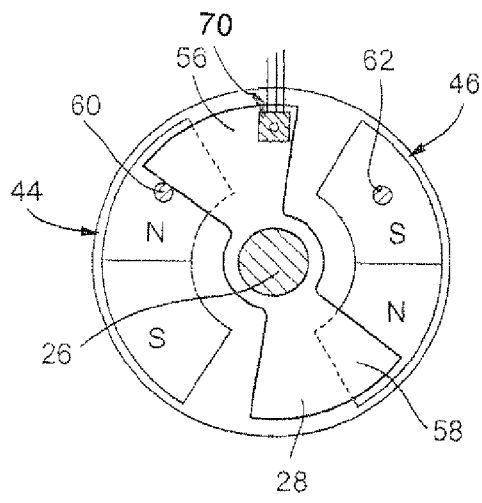
FIG. 5 is sectioned bottom view taken along line A-A of FIG. 2 of a bistable actuator embodiment in a first latched position.

In the example embodiment which functions as a bistable actuator (e.g., a bistable solenoid), the rotor is held in either a first latched radial position (shown in FIG. 5) or a second latched radial position (shown in FIG. 7), and can be switched between the first latched radial position and the second latched radial position in dependence upon direction of electrical current applied to coil 40. In the bistable actuator embodiment in the first latched radial position of FIG. 5 the first flange segment 56 of the rotor 24 at least partially axially overlaps the north pole segment of first permanent magnet 44 and the second flange segment 58 of the rotor 24 at least partially axially overlaps the north pole segment of second permanent magnet 46, with an edge of rotor flange (particularly an edge of first flange segment 56) laterally abutting first stop member 60. FIG. 5 thus shows the actuator in a counter clock wise latched position. In the second latched radial position shown in FIG. 7, the first flange segment 56 of the rotor 24 at least partially axially overlaps the south pole segment of second permanent magnet 46 and the second flange segment 58 of the rotor 24 at least partially axially overlaps the south pole segment of first permanent magnet 44, with an edge of the rotor flange (particularly an edge of first flange segment 56) abutting second stop member 62.

The bistable actuator embodiment can also further comprise location sensor 70 mounted on second stationary pole member 42 but positioned radially between first permanent magnet 44 and second permanent magnet 46 whereby in the first latched position the rotor flange 56 overlies at least a portion of first permanent magnet 44 and the location sensor 70 but not the second permanent magnet 46, and in the second latched position the rotor flange 56 overlies at least a portion of second permanent magnet 46, the location sensor 70, but not the first permanent magnet 44. In an example implementation, in the first latched position of FIG. 5 the location sensor 70 provides a logic low signal, while in the second latched position of FIG. 7 the location sensor 70 provides a logic high signal. In the mid-stroke position of FIG. 6, the location sensor 70 provides an ambiguous output.

In one mode of operation described with respect to the bistable actuator embodiment, the solenoid shaft (e.g., rotor shaft 26) is rotatable through a limited angle of rotation such as forty five degrees. The bistable actuator embodiment has two stable positions effected by a torque moment provided by stationary permanent magnets (e.g., first permanent magnet 44 and second permanent magnet 46) that hold the shaft at either of two stop positions (e.g., a first stop position shown in FIG. 5 and defined by first stop member 60 and a second stop position shown in FIG. 7 and defined by second stop member 62). If the shaft is forcibly rotated away from a stop position, a resisting torque is present until the shaft reaches the mid-stroke position shown in FIG. 6. At the critical mid-stroke position of FIG. 6 the torque becomes zero. At either side of the mid-stroke position a torque urges rotation toward the nearest stop position (e.g., toward the stop position of FIG. 5 or the stop position of FIG. 7). Thus the solenoid is bi-stable in this mode and will hold the shaft 26 at each stop position (e.g., either the stop position of FIG. 5 or the stop position of FIG. 7) against an opposing torque of up to the torque produced by the permanent magnets and without power applied to the coil 40.

In the illustrated embodiments, the electrical coil 40 is a simple cylindrically wound winding of magnet wire having one or more layers and an inside diameter through which is inserted each of the two base pole extensions (e.g., second stationary pole member 42 and first stationary pole member 48), permanent magnets 44, 46, and rotor 24.

In the bistable actuator embodiment, when the coil 40 is energized with a direct current (D.C.) voltage, one end of the coil induces a north magnetic field into its adjacent base pole and the other end of the coil induces a south magnetic field into its adjacent base pole, the magnetic polarity being dependent upon the electrical polarity applied to the coil. The induced magnetic intensity of coil 40 is summed with those of the permanent magnets 44, 46 (both additive and opposed) to effect a net magnetic attraction on the rotor and thus a torque results, as described below. The location sensor 70 is included to detect the magnetic polarity induced into the movable rotor and to present a logic level (hi or low) for the purpose of monitoring the current latched position of the rotor.

Figure 6:
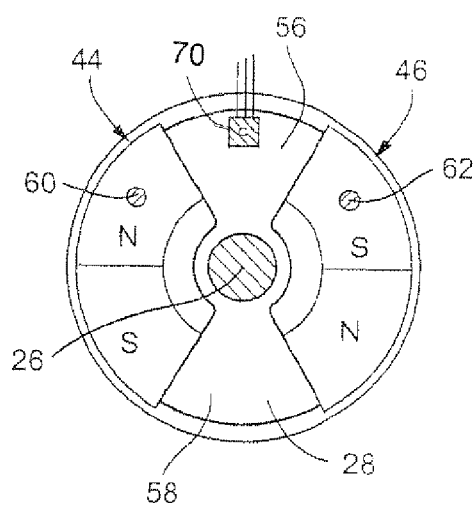
FIG. 6 is sectioned bottom view taken along line A-A of FIG. 2 of a bistable actuator embodiment in a mid-stroke position.
Figure 7:
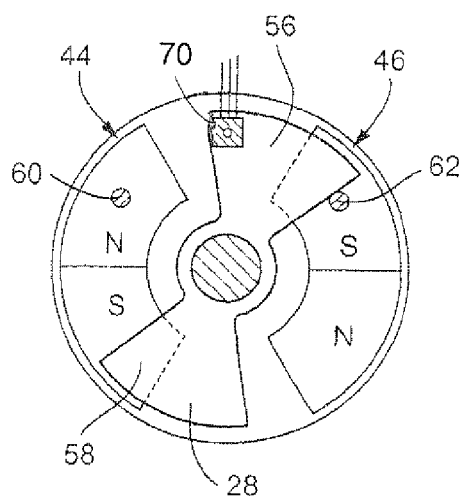
FIG. 7 is sectioned bottom view taken along line A-A of FIG. 2 of a bistable actuator embodiment in a second latched position.

For the first mode of operation (the bi-stable, latching actuator), FIG. 5 through FIG. 7 show the relative positions of the rotor 24 and permanent magnets 44, 46. FIG. 5 and FIG. 7 are holding positions which are stably maintained by the magnetic field of the permanent magnet segment over which the rotor is overlapped and by the stop pin contacting a side or edge of the rotor.

Figure 8A:
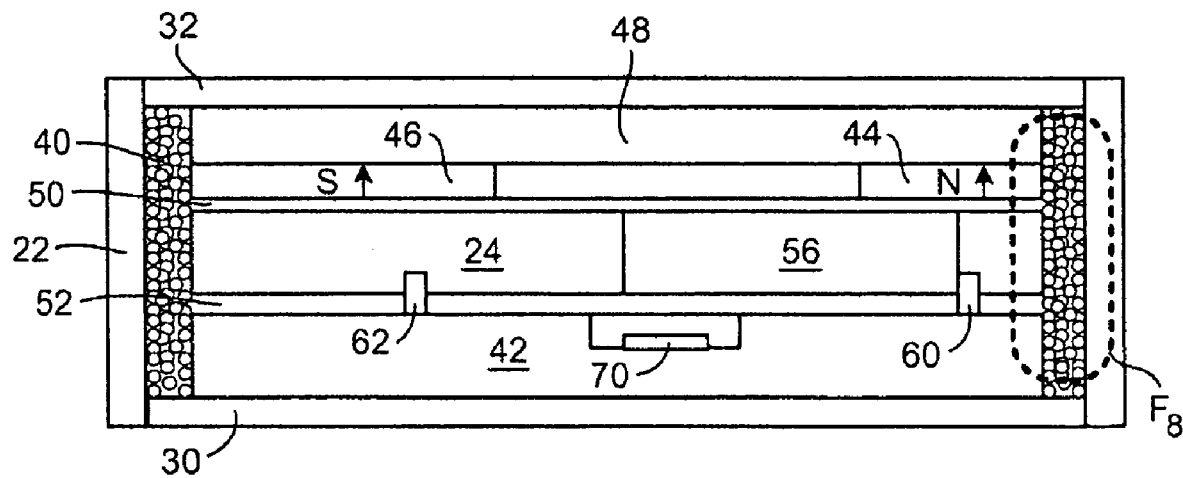
FIG. 8A is a partial side view and FIG. 8B is a sectioned schematic side though a rotor flange segment, both FIG. 8A and FIG. 8B showing a magnetic circuit of an example embodiment of a bistable actuator.
Figure 8B:
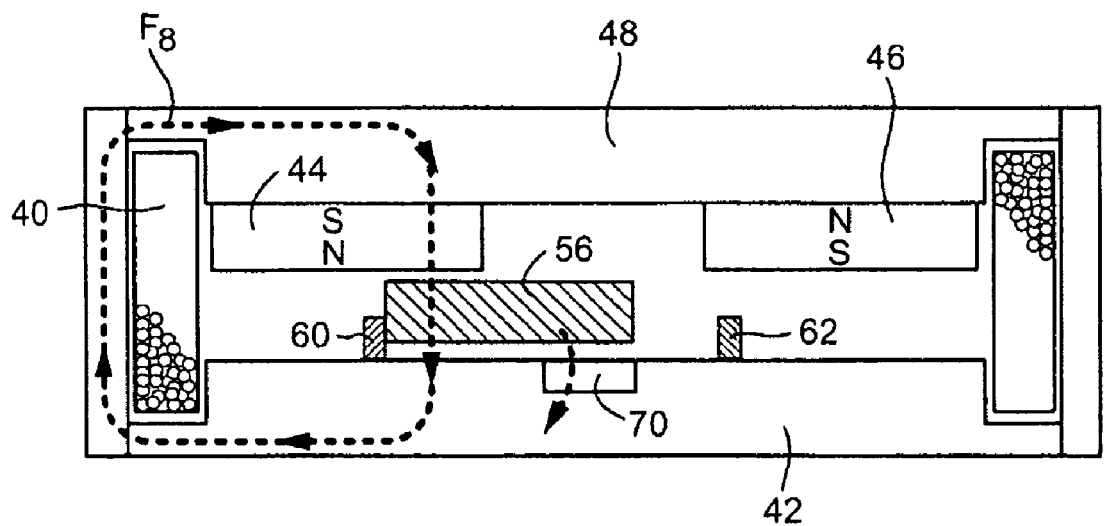
Figure 9A:
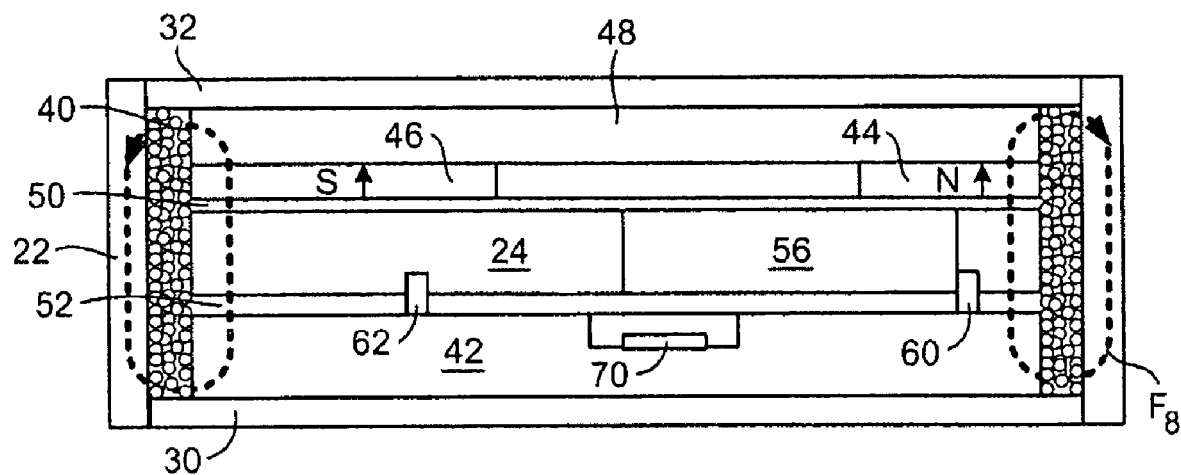
FIG. 9A is a partial side view and FIG. 9B is a sectioned schematic side view though a rotor flange segment, showing the bistable actuator of FIG. 8A and FIG. 8B, respectively, in a first latching position but when a coil is activated to begin rotation of the rotor from the first latching position.
Figure 9B:
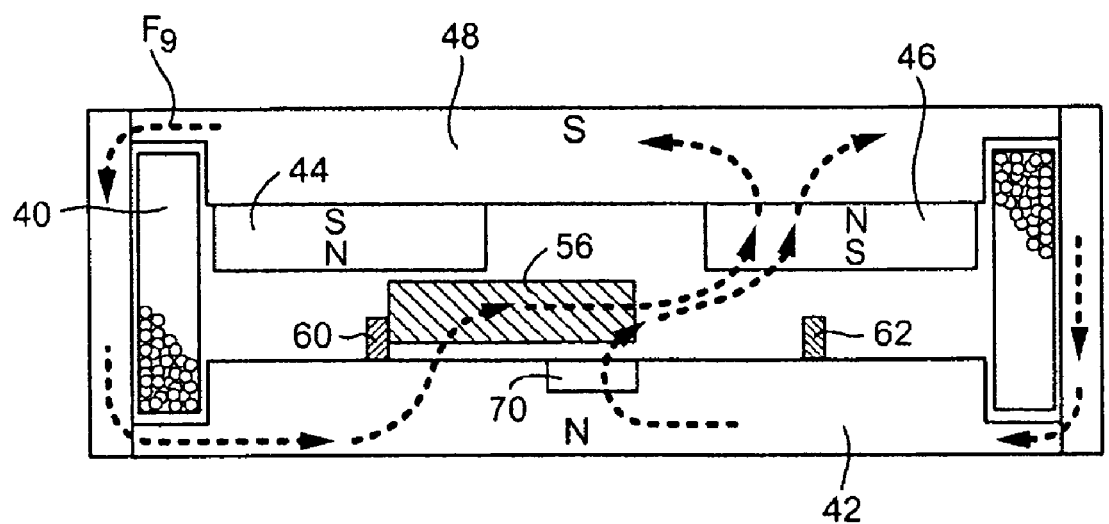

FIG. 8A and FIG. 8B both illustrate a magnetic circuit of an example embodiment of a bistable actuator in a situation in which no current is applied to coil 40. FIG. 9A and FIG. 9B both illustrate the magnetic circuit of the same bistable actuator in a situation in which current begins to be applied to coil 40 (causing the upper or first stationary pole member 48 to become South magnetically and the lower or second stationary pole member 42 to become North magnetically). FIG. 19A and FIG. 10B both illustrate the magnetic circuit of the same bistable actuator in a situation in which current in coil 40 has caused the rotor 24 to rotate to a second latching position. Whereas FIG. 8A, FIG. 9A, and FIG. 10A are partial side views of selected elements of the bistable actuator, FIG. 8B, FIG. 9B and FIG. 10B are sectioned side views though a rotor flange segment 56 as seen from a direction opposite that of FIG. 8A, FIG. 9A, and FIG. 10A, respectively.

FIG. 8A shows that the magnetic circuit of the bistable actuator embodiment, which includes a stator base pole (lower base pole or second stationary pole member 42) which is juxtaposed to that which holds the magnets (upper base pole or first stationary pole member 48). The magnet flux as depicted by flux line $F_8$ in FIG. 8A therefore leaves the permanent magnet, crosses air gap 50 to rotor 24, extends through rotor 24 and across air gap 52 to the lower base pole (e.g., second stationary pole member 42), through the lower base pole and housing 22 to the opposite base (e.g., first stationary pole member 48) and into the magnet. FIG. 8A happens to show one flux line $F_8$ which extends through first flange segment 56 when first flange segment 56 overlaps the north pole segment of first permanent magnet 44. It will be appreciated that other flux lines could be illustrated as extending in comparable manner as flux line $F_8$ around the entire peripheries of the second stationary pole member 42 and first stationary pole member 48. It just so happens that flux line $F_8$ illustrates maximum flux transfer which occurs at a maximum overlap area of rotor 24 and a permanent magnet as permitted by stop pin 60 which defines the holding (first latched) position as shown in FIG. 5. FIG. 8B shows the rotor 24 latched toward first permanent magnet 44 and against first stop member 60 (note that, in view of the opposite viewing direction of FIG. 8B relative to FIG. 8A, first stop member 60 is the left stop member in FIG. 8B rather than the right stop member). As shown in FIG. 8B, magnetic flux $F_8$ passes through the rotor flange segment 56 and location sensor 70. The location sensor 70 sees a North magnetic polarity and responds with an appropriate output level.

FIG. 9A and FIG. 9B show the bistable actuator of FIG. 8A and FIG. 8B in a first latching position but when coil 40 has just been activated to begin rotation of the rotor from the first latching position toward the second latching position (at the time shown in FIG. 9A and FIG. 9B the rotor 24 has not yet moved). That is, FIG. 9A and FIG. 9B show a situation in which, when voltage is applied to coil 40 in a direction (e.g., with polarity) favorable to the south pole segments, the base poles (e.g., second stationary pole member 42 and first stationary pole member 48) are polarized such that the overlapped magnet segments (the north pole segments of first permanent magnet 44 and second permanent magnet 46) see an opposing field, produced by the coil 40, which diminishes the flux formerly contributing to the latching torque and which formerly held the rotor in the first latched position shown in FIG. 5. The coil current causes the upper or first stationary pole member 48 to become South magnetically and the lower or second stationary pole member 42 to become North magnetically. In this situation, the non-overlapped magnet segment, e.g., the south pole segments of first permanent magnet 44 and second permanent magnet 46, having the opposite magnetic polarization, will therefore see an aiding magnetic field resulting in an intense magnetic potential between the south pole segments of the magnets 44, 46 and rotor 24. The coil flux into the rotor 24 sees a repulsion force from the magnet segments overlying the rotor 24. The coil flux cause rotor 24 to become North magnetically and is attracted to the South magnetic faces of the permanent magnets 44, 46. This strong attraction of the rotor 24 to the south pole segments and the reduced attraction produces rotation. In other words, the rotor 24 rotates from the first latching position of FIG. 5, through the mid-stroke position of FIG. 6, and to the second latching position of FIG. 7. The output of the location sensor 70 is not considered as valid when the coil current is applied.

Figure 10A:
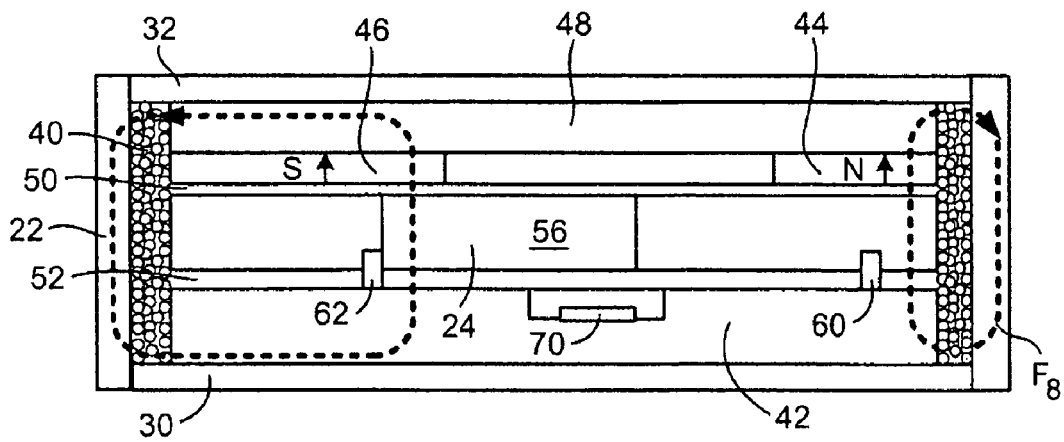
FIG. 10A is a partial side view and FIG. 10B is a sectioned schematic side view though a rotor flange segment, showing the bistable actuator of FIG. 8A and FIG. 8B, respectively, in a second latching position after a coil has been activated to rotate the rotor toward the second latching position.
Figure 10B:
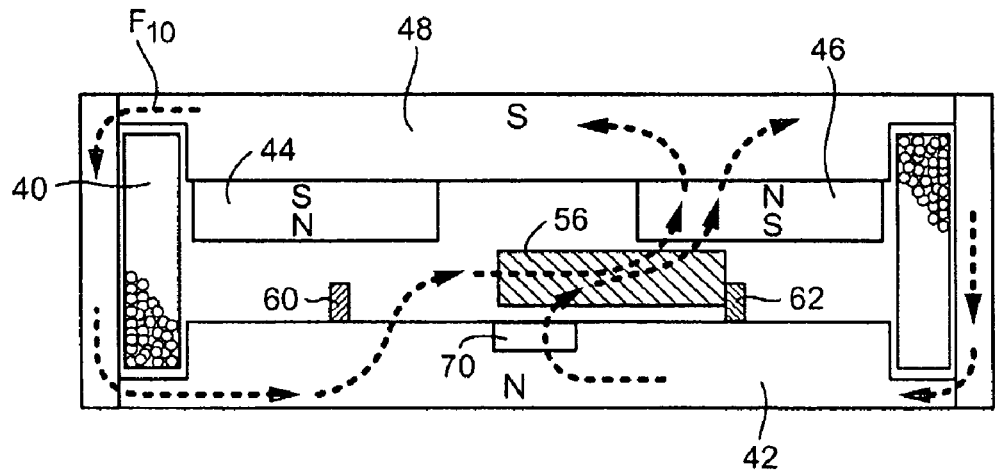

FIG. 10A and FIG. 10B show the bistable actuator of FIG. 8A and FIG. 8B in a second latching position after coil 40 has been activated to rotate the rotor 24 toward the second latching position. In other words, the rotor 24 has moved in response to the conditions described with respect to FIG. 9A and FIG. 9B. FIG. 10A and FIG. 10B thus show the second latching position of FIG. 7 and the additive nature of the south pole segment of the second permanent magnet 46 and the field which results from the voltage in coil 40 when the voltage is applied with a polarity which is favorable to the south pole segments (and thus to move the rotor to the second latching position of FIG. 7). The current to coil 40 can now be turned off. Magnetic flux from the overlying South faces of the permanent magnets 44, 46 sustains the latching force in the second latching position (similar to the way the North faces of the permanent magnets 44, 46 sustained the latching force in the first latching position). In the second latching position the rotor flange segment 56 is adjacent the South magnet faces of the permanent magnets 44, 46. Therefore, the location sensor 70 sees a magnetic polarity which is the reverse to that of FIG. 8A and FIG. 8B, and accordingly there is a reversal of the output logic level of the location sensor 70.

Figure 11:
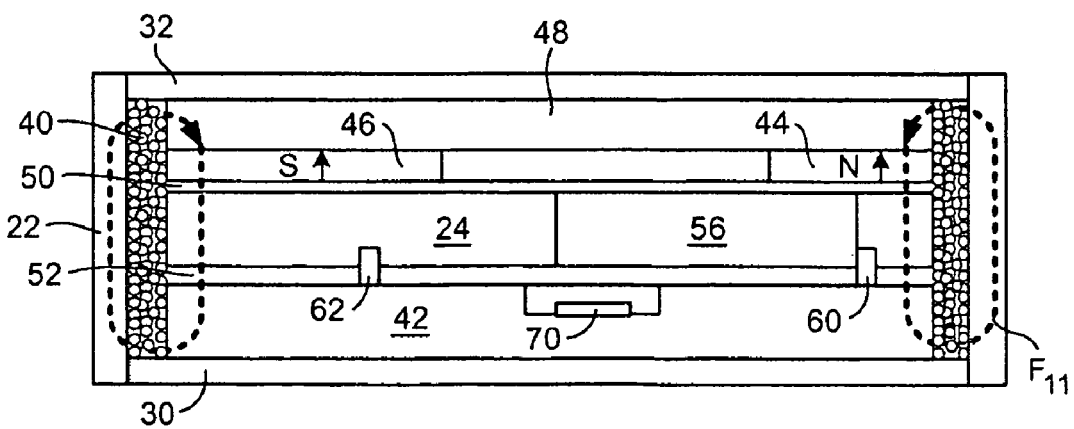
FIG. 11 is a partial side view showing the bistable actuator of FIG. 8A in the first latching position and when a coil has been activated to increase the magnetic holding torque in the first latching position.

Of course, it should also be realized that the magnetic holding torque can be increased by allowing a coil current of the correct polarity to be maintained in the coil. For example, the magnetic holding torque illustrated in FIG. 8A can be increased by applying voltage to coil 40 with a direction (e.g., polarity) favorable to the north pole segments, as shown in FIG. 11. FIG. 11 shows the bistable actuator of FIG. 8A in the first latching position and when coil 40 has been activated to increase the magnetic holding torque in the first latching position. In FIG. 11 the field produced by the current in coil 40 is additive to the north pole segments of first permanent magnet 44 and second permanent magnet 46, but subtractive relative to the south pole segments, and thus serves for retaining the rotor in the first latched position (shown both in FIG. 5 and FIG. 11).

With the preferred embodiment as illustrated in this disclosure, the solenoid performance is assumed to be symmetrical regardless of direction of rotation. It is feasible, however, to supplement the solenoid with springs to alter the driving or holding torque symmetry.

The magnetic sensor 70 previously mentioned is located in a basically neutral magnetic zone very near the air gap 52 between the lower base (e.g., second stationary pole member 42) and the rotor 24. At each of the stable positions of the rotor, the rotor (e.g., first flange segment 56) overlaps both a magnet segment (e.g., either the north pole segment of first permanent magnet 44 and the magnetic sensor 70 [see FIG. 5] or the south pole segment of second permanent magnet 46 and the magnetic sensor 70 [see FIG. 7]. The ferrous rotor shaft 26 is induced magnetically by the permanent magnet segment and conducts the magnet field into close proximity of the sensor 70. The sensor 70 therefore detects a north magnetic field if the rotor is overlapping a north magnetic segment or a south magnetic field if the rotor is overlapping a south magnetic segment. The sensor 70 produces a high or low logic signal dependent upon the rotor position.

Figure 12:
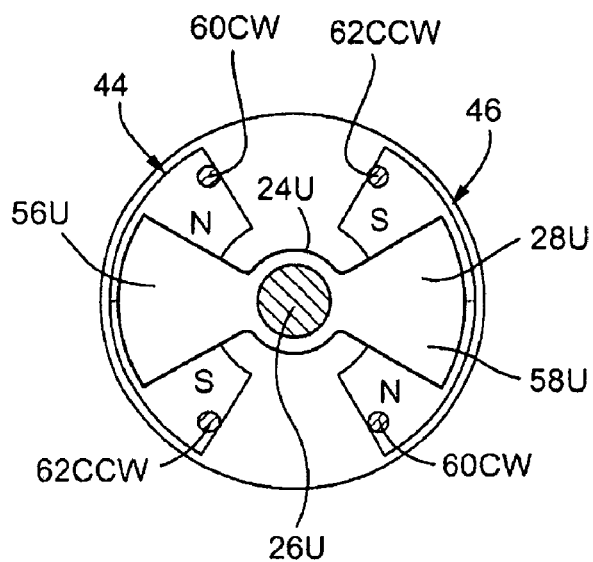
FIG. 12 is sectioned bottom view taken along line A-A of FIG. 2 of a unistable actuator embodiment in a mid-stroke position.
Figure 13:
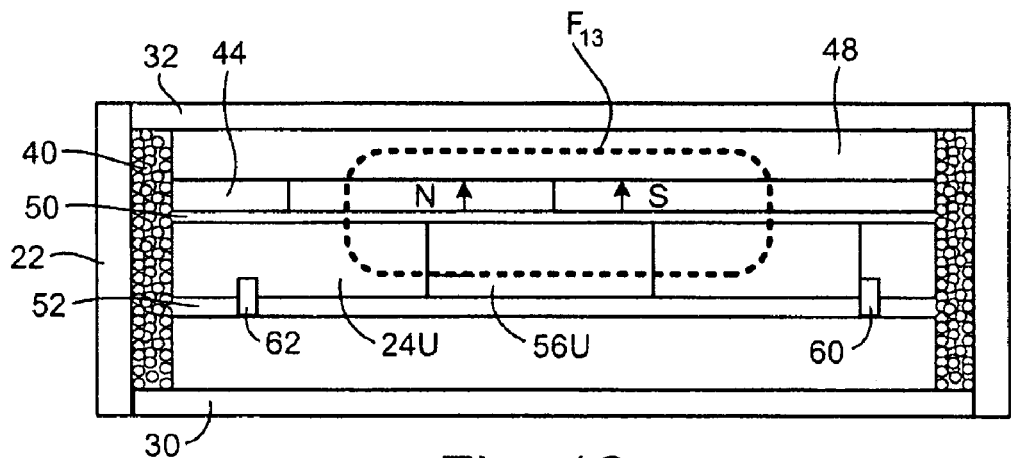
FIG. 13 is a partial side view showing a magnetic circuit of an example embodiment of a unistable actuator of FIG. 12.
Figure 14:
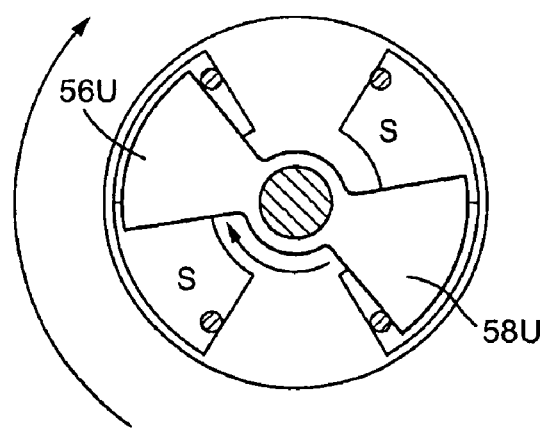
FIG. 14 is sectioned bottom view taken along line A-A of FIG. 2 of a unistable actuator embodiment in a rotated (e.g., off-mid-stroke) position.

Another example embodiment of the actuator known as a unistable actuator is illustrated in FIG. 12-FIG. 14. The unistable actuator of FIG. 12 is realized as differing from the bistable actuator of FIG. 5-FIG. 11 by having a differently positioned rotor 24U and additional/relocated stop members. In particular, the rotor shaft 26U of the unistable actuator of FIG. 12 is repositioned about its axis by ninety degrees relative to the rotor shaft 26 of the bistable actuator, so that rotor 24U is held in a stable position whereat rotor first flange segment 56U equally overlaps the north pole segment and the south pole segment of first permanent magnet 44 and rotor second flange segment 58U equally overlaps the north pole segment and the south pole segment of second permanent magnet 46. In the unistable actuator embodiment the rotor can be rotated away from the stable position (shown in FIG. 12) by application of a current to the electrically conductive coil 40.

The unistable actuator embodiment of FIG. 12 comprise two clockwise boundary stop members and two counter clockwise boundary stop members mounted at radially spaced apart locations to the second stationary pole member. In this regard, first clockwise boundary stop member 60CW is mounted proximate the edge of the north pole segment of first permanent magnet 44 and second clockwise boundary stop member 62CW is mounted proximate the edge of the north pole segment of second permanent magnet 46. First counterclockwise boundary stop member 60CCW is mounted proximate the edge of the south pole segment of first permanent magnet 44 and second counterclockwise boundary stop member 62CCW is mounted proximate the edge of the south pole segment of second permanent magnet 46. All four stop members extend in a direction parallel to the rotor axis for selective abutment of the appropriate edges of the rotor flange.

Thus, in the unistable actuator embodiment, due to a repositioning of the rotor 24U and stop pins, the rotor shaft 26U is again rotatable through a limited angle of rotation and is constrained between stops (60CW, 62CW, 60CCW, and 62CCW) to provide an operational zone relative to the stationary permanent magnets (e.g., first permanent magnet 44 and second permanent magnet 46). In this second mode, the rotor shaft 26U has a single stable position, usually at its mid-stroke position (shown in FIG. 12). If the shaft 26U is forcibly rotated away from this stable position in either direction, a restoring torque will urge the shaft 26U back to the stable position. This restoring torque is effected by the permanent magnets 44, 46 without power applied to the coil 40. Yet, as explained above, when a direct current (D.C.) coil voltage is applied, the shaft 26U will rotate in either of two directions depending upon the polarity of the applied voltage.

FIG. 12 thus shows, for the unistable actuator embodiment and mode of operation, the rotor 24U at rest and equally overlapping areas of the north and south magnetic segments of each magnet 44, 46. This stable position is due to the permanent magnet flux reaching a maximum level at the position shown in FIG. 12. As shown in FIG. 13, this maximum magnetic flux level circulates (as shown by flux line $F_{13}$) from one magnet segment (e.g., from the north pole segment of first permanent magnet 44 shown in FIG. 13), across air gap 50, into the rotor 24U (e.g., into first flange segment 56U as shown in FIG. 13) and back across air gap 50 into the oppositely polarized magnet segment (e.g., into north pole segment of first permanent magnet 44). This occurs at each end of the rotor (e.g., for each of first flange segment 56U and second flange segment 58U).

When voltage is applied one to coil 40, one of the magnet segments will be opposed and the other aided, which imbalance will result in rotation of the rotor 24U toward the aided magnet segment (that with the highest flux level). For example, FIG. 14 shows a situation in which voltage is applied to coil 40 in a manner to aid the north pole segments of first permanent magnet 44 and second permanent magnet 46, which results in clockwise rotation of rotor 24U relative to the unistable position of FIG. 12. The amount of torque and degree of rotation will be proportional to the coil current and the direction of rotation will be polarity responsive with a smooth transition at mid-stroke.

No provision for a position sensor is shown for the unistable actuator of FIG. 12, since the stable (off) position is an ambiguous position for the sensor.

From the foregoing it should be understood that the choice of operational mode; i.e., bi-stable actuator (as shown in FIG. 5-FIG. 11) or unistable actuator (as shown in FIG. 12-FIG. 14) can be determined by the location of the rotational stops and the constrained location of the rotor relative to the permanent magnets 44, 46. Thus, the generic structure of FIG. 1-FIG. 4 can be adapted for either the bi-stable actuator embodiment or the unistable actuator embodiment.

The bistable latching mode of the actuator/solenoid is intended to be an intermittently operated actuator for conserving power after the attached load or object is moved. Two-position devices such as valves, locks and latches, dispensers, sorters, conveyor gates, indicators, etc. serve as examples. Devices that require the capability for a manual override are applicable as the solenoid will not be stressed or damaged due to externally forced movement and the sensor will remain active without power to the coil. Latching is achieved with no wearing parts such as detents, friction pads, springs or mechanical toggles and the magnet is not impacted at the end of stroke. External stops may be employed at any position within the stroke without defeating the holding torque function.

In the unistable mode the actuator/solenoid is useful for driving center-off devices and three position devices such as dispensers, sorters, valves, clutches, brakes, and proportional or scanning devices such as valves, mirrors, sensors, etc. The unistable actuator/solenoid can be manually overridden and external stops can be used at any position within the useable stroke range.

The permanent magnets 44, 46 are a stationary feature of the stator. The rotor assembly of this disclosure is robust mechanically and tolerant of the effects of mechanical shock which may be induced into the rotor during rapid start and stop actuations. Permanent magnets of the Neodymium Iron Boron, ceramic, and Samarium Cobalt types are very hard and brittle. Mechanical shock arising from striking against end stops or from making attachments to the shaft extension by the user can cause the magnet to fracture. With the magnets 44, 46 being bonded or affixed to the stator bases, the magnets 44, 46 are significantly better isolated from induced shock and, if they were to fracture, the magnets would still remain bonded with little or no noticeable decrement in performance.

The combined functionality of bi-directional motion, both proportional and snap-acting, with power-off latching and position sensing in a simple two-pole construction with one single-wound coil provides a versatile low cost actuator. The construction is robust, enclosed, tamper resistant, shock tolerant, fast response and long lived.

Most rotational actuators have a magnetic flux direction that is radially oriented with the rotor and stator poles such as in motor construction. The actuators of the technology disclosed herein utilize an axial flux direction parallel with the rotatable shaft which also allows for its simple coil construction. It can be shown mathematically that an exchange in magnetic energy at the air gaps 50, 52 equates to the work done by the solenoid upon changing from one position to the other. Because the air gap distance remains constant (typically a distance of 0.015 inch) and only the permeance of the gap changes due to the area of overlap, the torque profile tends to follow a constant or linear slope as opposed to the exponential profile exhibited by a closing air gap solenoid. This profile is preferred for producing both a high starting torque and ending torque.

By bonding the permanent magnets to the stator members, the magnets are isolated from the mechanical shock of actuation and stopping against the stops. The iron rotor, affixed to the shaft by a press-fit over splines on the shaft, provides a robust rotor assembly that is immune to rotational shock and any incurred by the user during installation. Ball bearings at each end of the solenoid provide robust stability to the rotor and shaft, maintain precision internal air gaps, and give long life for the actuator.

The location sensor 70 can, in an example embodiment, be a low-cost Hall Effect bi-polar switch located near the air gap as defined by the rotor and the lower base pole (see FIG. 2). Because the rotor is induced magnetically by the polarity of the magnet segment which produces the holding torque, the single sensor detects either stable position of the rotor for interrogation by electronic means.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An actuator comprising:
   an electromagnetically conductive housing;
   a rotor comprising:
      a rotor shaft situated for rotational motion about a rotor axis, the rotor shaft extending axially beyond the housing;
      an electromagnetically conductive rotor flange connected to the rotor shaft, the rotor flange comprising a first flange segment and a second flange segment which extend in different radial directions relative to the rotor shaft;
   a first stationary pole member retained at a first axial position with respect to the rotor axis;
   a second stationary pole member retained at a second axial position with respect to the rotor axis;
   a first permanent magnet connected to the first pole member, the first permanent magnet extending essentially on a first radial side of the rotor axis, the first permanent magnet comprising a north pole segment and a south pole segment;
   a second permanent magnet connected to the first pole member, the second permanent magnet extending essentially on a second radial side of the rotor axis, the second permanent magnet comprising a north pole segment and a south pole segment;
   an electrically conductive coil situated within the housing and configured to define a cavity in which are arranged, in axial order, the second stationary pole member, the rotor flange, the first permanent magnet and the second permanent magnet; and the first stationary pole member, with a first air gap provided between the rotor flange and the first permanent magnet and a second air gap provided between the rotor flange and the second stationary pole member;
   wherein the rotor is held in either a first latched radial position or a second latched radial position and is switched between the first latched radial position and the second latched radial position in dependence upon direction of electrical current applied to the coil;
   a first stop member and a second stop member mounted at radially spaced apart locations to the second stationary pole member, the first stop member and the second stop member extending in a direction parallel to the rotor axis for selective abutment of the rotor flange;
   wherein in the first latched radial position the first flange segment of the rotor at least partially axially overlaps the north pole segment of the first permanent magnet and the second flange segment of the rotor at least partially axially overlaps the north pole segment of the second permanent magnet, and wherein the rotor flange abuts the first stop member;
   wherein in the second latched radial position the first flange segment of the rotor at least partially axially overlaps the south pole segment of the second permanent magnet and the second flange segment of the rotor at least partially axially overlaps the south pole segment of the first permanent magnet, and wherein the rotor flange abuts the second stop member.

2. The actuator of claim 1, wherein a first air gap is provided between the rotor flange and the permanent magnets mounted on the first pole member and a second air gap is provided between rotor flange and the second pole member, and wherein flux in the first air gap and the second air gap is primarily in an axial direction parallel to the rotor axis.

3. The actuator of claim 1, wherein the first permanent magnet and the second permanent magnet each have semi-torroidal shape about the rotor axis and are circumferentially spaced apart on the first stationary pole member.

4. The actuator of claim 1, wherein the first permanent magnet and the second permanent magnet are symmetric about the rotor axis.

5. The actuator of claim 1, wherein each of the first flange segment and the second flange segment are pie-shaped wedges that extend in opposite directions in a radial plane that is perpendicular to the rotor axis.

6. An actuator comprising:
an electromagnetically conductive housing;
a rotor comprising:
a rotor shaft situated for rotational motion about a rotor axis, the rotor shaft extending axially beyond the housing;
an electromagnetically conductive rotor flange connected to the rotor shaft, the rotor flange comprising a first flange segment and a second flange segment which extend in different radial directions relative to the rotor shaft;
a first stationary pole member retained at a first axial position with respect to the rotor axis;
a second stationary pole member retained at a second axial position with respect to the rotor axis;
a first permanent magnet connected to the first pole member, the first permanent magnet extending essentially on a first radial side of the rotor axis, the first permanent magnet comprising a north pole segment and a south pole segment;
a second permanent magnet connected to the first pole member, the second permanent magnet extending essentially on a second radial side of the rotor axis, the second permanent magnet comprising a north pole segment and a south pole segment;
an electrically conductive coil situated within the housing and configured to define a cavity in which are arranged, in axial order, the second stationary pole member, the rotor flange, the first permanent magnet and the second permanent magnet; and the first stationary pole member, with a first air gap provided between the rotor flange and the first permanent magnet and a second air gap provided between the rotor flange and the second stationary pole member;
wherein the rotor is held in either a first latched radial position or a second latched radial position and is switched between the first latched radial position and the second latched radial position in dependence upon direction of electrical current applied to the coil;
a location sensor mounted on the second stationary pole member but positioned radially between the first permanent magnet and the second permanent magnet whereby, in the first latched position the rotor flange overlies at least a portion of first permanent magnet and the location sensor but not the second permanent magnet, and in the second latched position the same rotor flange overlies at least a portion of the second permanent magnet and the location sensor, but not the first permanent magnet.

7. The actuator of claim 6, wherein a first air gap is provided between the rotor flange and the permanent magnets mounted on the first pole member and a second air gap is provided between rotor flange and the second pole member, and wherein flux in the first air gap and the second air gap is primarily in an axial direction parallel to the rotor axis.

8. The actuator of claim 6, wherein the first permanent magnet and the second permanent magnet each have semi-torroidal shape about the rotor axis and are circumferentially spaced apart on the first stationary pole member.

9. The actuator of claim 6, wherein the first permanent magnet and the second permanent magnet are symmetric about the rotor axis.

10. The actuator of claim 6, wherein each of the first flange segment and the second flange segment are pie-shaped wedges that extend in opposite directions in a radial plane that is perpendicular to the rotor axis.

11. The actuator of claim 6, wherein each of the first flange segment and the second flange segment are pie-shaped wedges that extend in opposite directions in a radial plane that is perpendicular to the rotor axis.

12. An actuator comprising:
an electromagnetically conductive housing;
a rotor comprising:
a rotor shaft situated for rotational motion about a rotor axis, the rotor shaft extending axially beyond the housing;
an electromagnetically conductive rotor flange connected to the rotor shaft, the rotor flange comprising a first flange segment and a second flange segment which extend in different radial directions relative to the rotor shaft;
a first stationary pole member retained at a first axial position with respect to the rotor axis;
a second stationary pole member retained at a second axial position with respect to the rotor axis;
a first permanent magnet connected to the first pole member, the first permanent magnet extending essentially on a first radial side of the rotor axis, the first permanent magnet comprising a north pole segment and a south pole segment;
a second permanent magnet connected to the first pole member, the second permanent magnet extending essentially on a second radial side of the rotor axis, the second permanent magnet comprising a north pole segment and a south pole segment;
an electrically conductive coil situated within the housing and configured to define a cavity in which are arranged, in axial order, the second stationary pole member, the rotor flange, the first permanent magnet and the second permanent magnet; and the first stationary pole member, with a first air gap provided between the rotor flange and the first permanent magnet and a second air gap provided between the rotor flange and the second stationary pole member;
wherein the rotor is held in a stable position whereat the first flange segment equally overlaps the north pole segment and the south pole segment of the first permanent magnet and the second flange segment equally overlaps the north pole segment and the south pole segment of the second permanent magnet, and wherein the rotor is rotated away from the stable position by application of a current to the electrically conductive coil.

13. The actuator of claim 12, further comprising two clockwise boundary stop members and two counter clockwise boundary stop members mounted at radially spaced apart locations to the second stationary pole member, the stop members extending in a direction parallel to the rotor axis for selective abutment of the rotor flange.

14. The actuator of claim 13, wherein a first air gap is provided between the rotor flange and the permanent magnets mounted on the first pole member and a second air gap is provided between rotor flange and the second pole member, and wherein flux in the first air gap and the second air gap is primarily in an axial direction parallel to the rotor axis.

15. The actuator of claim 13, wherein the first permanent magnet and the second permanent magnet each have semi-torroidal shape about the rotor axis and are circumferentially spaced apart on the first stationary pole member.

16. The actuator of claim 13, wherein the first permanent magnet and the second permanent magnet are symmetric about the rotor axis.

17. The actuator of claim 13, wherein each of the first flange segment and the second flange segment are pie-shaped wedges that extend in opposite directions in a radial plane that is perpendicular to the rotor axis.

18. The actuator of claim 12, wherein each of the first flange segment and the second flange segment are pie-shaped wedges that extend in opposite directions in a radial plane that is perpendicular to the rotor axis.

19. An actuator comprising:
an electromagnetically conductive housing;
a rotor comprising:
  a rotor shall situated for rotational motion about a rotor axis, the rotor shaft extending axially beyond the housing;
  an electromagnetically conductive rotor flange connected to the rotor shaft, the rotor flange comprising a first flange segment and a second flange segment which extend in different radial directions relative to the rotor shaft;
a first stationary pole member retained at a first axial position with respect to the rotor axis;
a second stationary pole member retained at a second axial position with respect to the rotor axis;
a first permanent magnet connected to the first pole member, the first permanent magnet extending essentially on a first radial side of the rotor axis, the first permanent magnet comprising a north pole segment and a south pole segment;
a second permanent magnet connected to the first pole member, the second permanent magnet extending essentially on a second radial side of the rotor axis, the second permanent magnet comprising a north pole segment and a south pole segment;
an electrically conductive coil situated within the housing and configured to define a cavity in which are arranged, in axial order, the second stationary pole member, the rotor flange, the first permanent magnet and the second permanent magnet; and the first stationary pole member, with a first air gap provided between the rotor flange and the first permanent magnet and a second air gap provided between the rotor flange and the second stationary pole member;
wherein each of the first flange segment and the second flange segment are pie-shaped wedges that extend in opposite directions in a radial plane that is perpendicular to the rotor axis.

* * * * *